(12) United States Patent
Kato et al.

(10) Patent No.: US 11,420,671 B2
(45) Date of Patent: Aug. 23, 2022

(54) TURNING UNIT

(71) Applicant: JTEKT CORPORATION, Osaka (JP)

(72) Inventors: Hideya Kato, Okazaki (JP); Takuya Nakayama, Okazaki (JP); Eiji Yamazaki, Nagoya (JP)

(73) Assignee: JTEKT CORPORATION, Kariya (JP)

( * ) Notice: Subject to any disclaimer, the term of this patent is extended or adjusted under 35 U.S.C. 154(b) by 25 days.

(21) Appl. No.: 16/891,860

(22) Filed: Jun. 3, 2020

(65) Prior Publication Data

US 2020/0385051 A1    Dec. 10, 2020

(30) Foreign Application Priority Data

Jun. 5, 2019   (JP) .............................. JP2019-105249

(51) Int. Cl.
*B62D 5/04* (2006.01)
*B62D 3/12* (2006.01)

(52) U.S. Cl.
CPC ......... *B62D 5/0448* (2013.01); *B62D 5/0403* (2013.01); *B62D 3/12* (2013.01); *B62D 5/0421* (2013.01)

(58) Field of Classification Search
CPC ...... B62D 5/0448; B62D 5/0403; B62D 3/12; B62D 5/0421
See application file for complete search history.

(56) References Cited

U.S. PATENT DOCUMENTS

| | | | | |
|---|---|---|---|---|
| 5,142,929 A | * | 9/1992 | Simpson, III | ....... F16H 25/2214 74/424.87 |
| 5,373,755 A | * | 12/1994 | Rohlinger | ........... F16H 25/2214 74/424.86 |
| 6,041,672 A | * | 3/2000 | Wang | .................. F16H 25/2214 74/424.87 |
| 9,416,856 B2 | * | 8/2016 | Sakaguchi | .......... F16H 25/2204 |
| 2009/0090207 A1 | * | 4/2009 | Chang | ................. F16H 25/2214 74/424.86 |

(Continued)

FOREIGN PATENT DOCUMENTS

| | | |
|---|---|---|
| EP | 3424798 A1 | 1/2019 |
| JP | 2014-105715 A | 6/2014 |
| JP | 2015-003704 A | 1/2015 |

OTHER PUBLICATIONS

Sep. 23, 2020 Extended Search Report issued in European Patent Application No. 20178031.9.

*Primary Examiner* — Jacob D Knutson
(74) *Attorney, Agent, or Firm* — Oliff PLC (57) ABSTRACT

A ball screw nut has a pair of through holes and a first passage that allows the through holes to communicate with each other and that opens radially outward. In each of the through holes, a ball screw mechanism has a circulation member having a second passage in which a ball can move between a ball raceway and the first passage. The ball screw mechanism has a circulation path for communicating the two connection points set on the ball raceway by the first passage and each of the second passages. A driven pulley has a thin portion that defines a radial clearance between an inner periphery of the driven pulley and an outer periphery of the ball screw nut. The ball screw mechanism has a pressing lid that presses down each of the circulation members from the outer periphery of the ball screw nut and that covers the first passage.

7 Claims, 7 Drawing Sheets

(56) References Cited

U.S. PATENT DOCUMENTS

2009/0294203 A1* 12/2009 Okada ................. B62D 5/0448
          180/444
2015/0321690 A1* 11/2015 Yamaguchi .......... B62D 5/0448
          180/444
2017/0349205 A1* 12/2017 Kaneko ................ B62D 5/0448
2017/0361866 A1* 12/2017 Bari .................... B62D 5/0448
2018/0100566 A1*  4/2018 Yamazaki ............ B62D 5/0448
2018/0354548 A1* 12/2018 Eickholt .............. B62D 5/0424
2019/0009814 A1*  1/2019 Ohashi ................ B62D 5/0424

* cited by examiner

TURNING UNIT

CROSS-REFERENCE TO RELATED APPLICATION

This application claims priority to Japanese Patent Application No. 2019-105249 filed on Jun. 5, 2019, incorporated herein by reference in its entirety.

BACKGROUND

1. Technical Field

The present disclosure relates to a turning unit.

2. Description of Related Art

There is a vehicle steering device provided with a turning unit that turns steered wheels with an actuator in which a motor serves as a drive source. For example, Japanese Unexamined Patent Application Publication No. 2015-3704 (JP 2015-3704 A) discloses a steering device configured as an electric power steering system (EPS) that uses a steering force applied by an actuator of a turning unit as an assisting force to assist a driver in steering.

In such a turning unit, an assist force is applied by transmitting a rotation of a motor to a ball screw mechanism via a belt mechanism and converting the rotation into an axial movement of a turning shaft in the ball screw mechanism. The ball screw mechanism has a ball screw nut that is fitted to an inner periphery of a driven pulley configuring a belt mechanism and that is screwed to the turning shaft via a plurality of balls. The ball screw mechanism is configured such that the balls are disposed in a helical ball raceway in which a screw groove provided on an inner periphery of the ball screw nut and a screw groove provided on an outer periphery of the turning shaft face each other. The ball screw mechanism has a circulation path for communicating two connection points set on the ball raceway, and the balls rolling in the ball raceway pass through the circulation path to move between the connection points from a downstream side to an upstream side and circulate indefinitely.

Here, in the turning unit according to JP 2015-3704 A described above, the above circulation path is configured by attaching a circulation member having a function of scooping up the ball from the ball raceway and a function of discharging the ball to the ball raceway, that is, by attaching a deflector, to an attachment hole that extends through the ball screw nut in the a radial direction. Further, the circulation member is fixed by being pressed down by a driven pulley fitted on the outer periphery of the ball screw nut so that the circulation member does not fall out of the attachment hole.

SUMMARY

Since a reduction ratio of the belt mechanism is determined by a ratio of outer diameters of driving and driven pulleys configuring the belt mechanism, the outer diameter of the driven pulley may be increased when the reduction ratio is increased. In contrast, in the above JP 2015-3704 A, since the driven pulley has the function of pressing the circulation member against the ball screw nut, an inner diameter of the driven pulley is determined by the outer diameter of the ball screw nut. As a result, when the reduction ratio is increased, there is a possibility that the thickness of the driven pulley is increased and the weight is increased. In JP 2015-3704 A described above, since the entire circulation path is configured by a passage formed inside the circulation member, the shape of the circulation member is complicated.

The present disclosure provides a turning unit in which the shape of a circulation member is simplified and an increase in the weight of the driven pulley can be suppressed.

A turning unit according to an aspect of the present disclosure includes: a turning shaft housed in a housing so that the turning shaft is reciprocable; a belt mechanism having a driving pulley coupled to a motor, a driven pulley disposed on an outer periphery of the turning shaft so that the driven pulley is rotatable, and a belt that is wound around between the driving pulley and the driven pulley; and a ball screw mechanism that has a ball screw nut coupled to the driven pulley so that the ball screw nut is integrally rotatable, and a plurality of balls disposed in a ball raceway that has a helical shape and that is provided such that a screw groove provided on an outer periphery of the turning shaft face a screw groove provided on an inner periphery of the ball screw nut, and that converts a rotation of the ball screw nut into reciprocating movement of the turning shaft. The ball screw nut has a pair of through holes extending through the inner periphery and an outer periphery of the ball screw nut, and a first passage that allows the through holes to communicate with each other and that opens radially outward. The ball screw mechanism has a circulation member having a second passage through which the ball can move between the ball raceway and the first passage in each of the through holes. The ball screw mechanism has a circulation path for communicating two connection points set on the ball raceway by the first passage and the second passages. The driven pulley has on an inner periphery, a thin portion that defines a radial clearance between the driven pulley and the outer periphery of the ball screw nut. The ball screw mechanism has a pressing lid that presses down each of the circulation members from the outer periphery of the ball screw nut and that covers the first passage.

According to the above aspect, since the circulation path is configured by the first passage provided in the ball screw nut and the second passage of a pair of the circulation members, the shape of each circulation member can be simplified, compared to when a path that configures the entire circulation path is provided in the circulation member, for example. Since the driven pulley is provided with a thin portion that defines a radial clearance between the driven pulley and the ball screw nut, it is possible to suppress an increase in the weight of the driven pulley when the outer diameter of the driven pulley is increased in order to increase the reduction ratio of the belt mechanism. The pressing lid restricts the circulation member from falling out of the through hole and the ball passing through the first passage and the second passage from jumping out.

In the above aspect, the thin portion may define the clearance configured to extend over an entire circumference of the ball screw nut. According to the above configuration, since the thickness of the driven pulley can be thinned over the entire circumference, it is possible to effectively suppress an increase in the weight of the driven pulley when the outer diameter of the driven pulley is increased.

In the above configuration, the pressing lid may be a pipe that has a tubular shape and that is fitted to the outer periphery of the ball screw nut. According to the above configuration, since the pressing lid is formed of a tubular pipe, even if the pipe is fixed to the outer periphery of the ball screw nut, the weight balance in the circumferential direction of the ball screw nut can be suppressed from being varied and smooth rotation of the ball screw nut can be maintained.

In the above configuration, the ball screw nut the ball screw nut may have a recessed portion on an outer peripheral surface; and the pipe may be clinched at a position facing the recessed portion toward the recessed portion and fixed to the ball screw nut.

For example, when a pipe serving as a pressing lid is press-fitted on the outer periphery of a ball screw nut and the pipe is brought into close contact with the outer periphery of the ball screw nut to press down each circulation member, there is a possibility of the pipe buckling during press-fitting if the thickness of the pipe is thin. Thus, in such a case, it is necessary to increase the wall thickness of the pipe, and the weight of the pipe is increased. In this regard, according to the configuration described above, since a part of the pipe is clinched so that the pipe is brought into close contact with the outer periphery of the ball screw nut to hold down each circulation member, the pipe can be loosely fitted on the outer periphery of the ball screw nut. Thus, the thickness of the pipe can be reduced to suppress an increase in the weight of the pipe. Further, an increase in the weight of the turning unit can be suppressed, compared to the case in which the pipe serving as the pressing lid is fixed to the ball screw nut with a bolt, for example.

In the above aspect, the pressing lid may be a curved plate that has a plate shape and that is curved so as to follow the outer periphery of the ball screw nut. According to the above configuration, since the pressing lid is configured of a curved plate, it is possible to suppress an increase in the weight of the pressing lid, compared to when the pressing lid is configured of a tubular pipe.

In the above aspect, the driven pulley may have on an inner periphery, a protruding portion protruding radially inward of the thin portion and the pressing lid may be the protruding portion.

According to the above configuration, since a part of the driven pulley functions as a pressing lid, it is possible to suppress an increase in the weight of the driven pulley while suppressing an increase in the number of parts.

According to the present aspect, it is possible to simplify the shape of a circulation member and suppress an increase in the weight of the driven pulley.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment of a steering device having a turning unit will be described with reference to the drawings. As illustrated FIG. 1, a steering device 1 has a steering shaft 3 to which a steering wheel 2 is coupled, a turning unit 6 that turns steered wheels 5 coupled to respective ends of a rack shaft 4 serving as a turning shaft, and a rack and pinion mechanism 7 serving as a conversion mechanism that converts a rotation of the steering shaft 3 into a reciprocating motion of a rack shaft 4.

Figure 1:
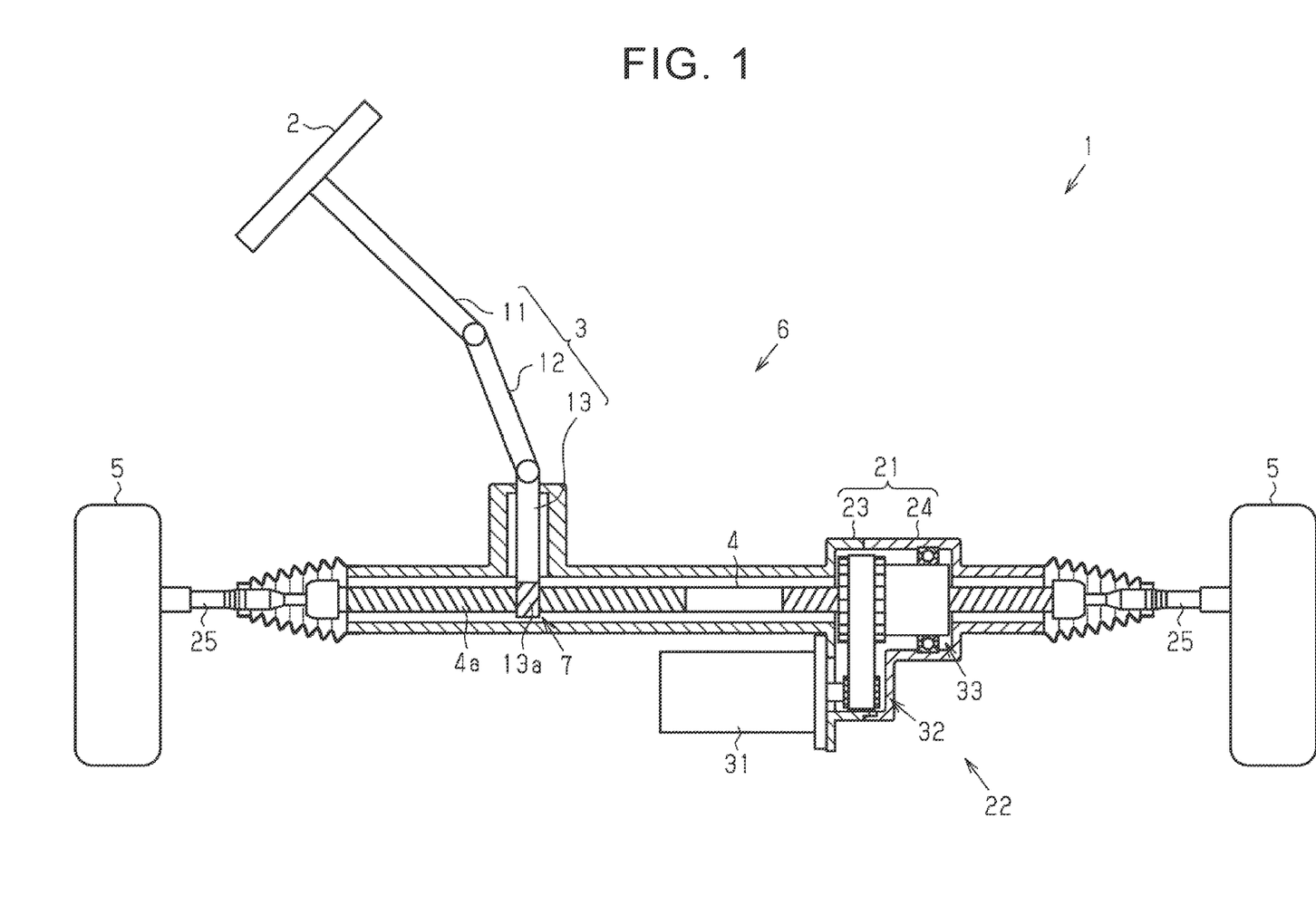
FIG. 1 is a schematic configuration of a steering device of a first embodiment.

The steering shaft 3 is configured by coupling a column shaft 11, an intermediate shaft 12, and a pinion shaft 13 in this order from the side where the steering wheel 2 is positioned. The pinion shaft 13 has pinion teeth 13a formed over the entire outer periphery.

The turning unit 6 has the rack shaft 4 described above and a rack housing 21 serving as a housing in which the rack shaft 4 is inserted so that the rack shaft 4 is reciprocable, and an EPS actuator 22 serving as an actuator that applies a turning force for turning the steered wheels 5 as an assist force for assisting a driver in steering. That is, the steering device 1 of the present embodiment is configured as an electric power steering system.

Rack teeth 4a are formed on the rack shaft 4 over a predetermined axial range. The rack housing 21 is formed by coupling a first housing member 23 and a second housing member 24 each having a cylindrical shape. The pinion shaft 13 and the rack shaft 4 are disposed in the first housing member 23 at a predetermined crossing angle. The rack and pinion mechanism 7 is configured by meshing the rack teeth 4a and the pinion teeth 13a. Tie rods 25 are connected to respective ends of the rack shaft 4 and distal ends of the tie rods 25 are coupled to knuckles, not shown, to which the steered wheels 5 are installed. In the steering device 1, a rotation of the steering shaft 3 in accordance with the steering operation is converted into an axial motion of the rack shaft 4 by the rack and pinion mechanism 7. The axial motion is transmitted to the knuckles via the tie rods 25 and thus, the steered angle of the steered wheels 5, that is, a moving direction of a vehicle is changed.

The EPS actuator 22 has a motor 31 that is a driving source, a belt mechanism 32 that transmits a rotation of the motor 31, and a ball screw mechanism 33 that converts a rotation transmitted via the belt mechanism 32 into a reciprocating motion of the rack shaft 4. The EPS actuator 22 is provided in a coupling portion of the first housing member 23 and the second housing member 24. The EPS actuator 22 applies a turning force obtained by converting transmitted rotation into a reciprocating motion of the rack shaft 4 as an assist force.

Next, the configuration of the EPS actuator 22 will be described in detail. Hereinafter, for convenience of explanation, an opposite side of the rack shaft 4 from the rack and pinion mechanism 7, that is, the right side in FIG. 2, is set as an axial first end side, and the rack and pinion mechanism 7 side, that is, the left side in FIG. 2, is set as an axial second end side.

Figure 2:
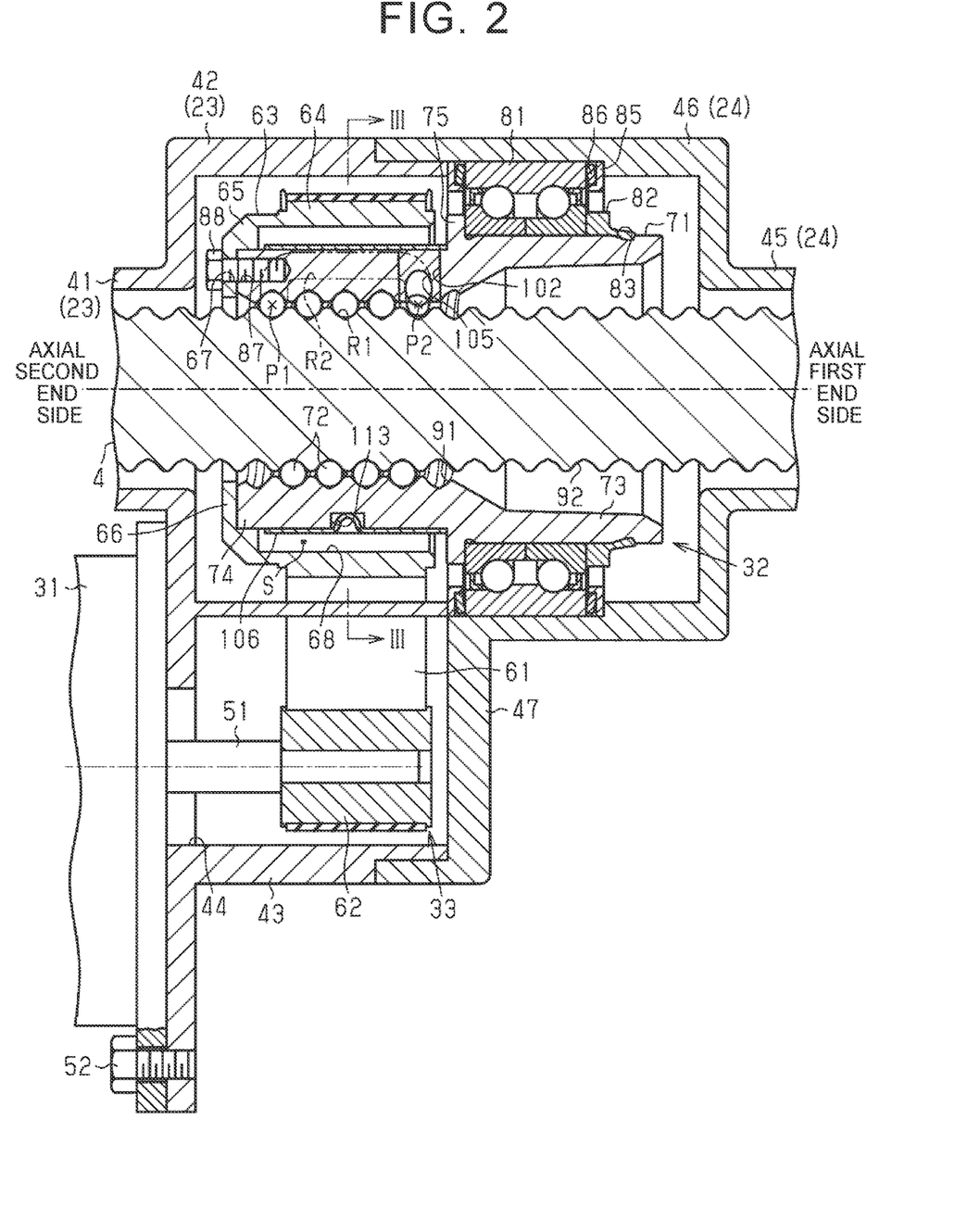
FIG. 2 is a sectional view of a vicinity of an EPS actuator of the first embodiment taken along an axial direction.

As illustrated FIG. 2, the first housing member 23 has a first tubular portion 41 and a first housing portion 42 that is formed on the first axial end side of the first tubular portion 41. The first housing portion 42 is formed in a tubular shape in which a diameter thereof is larger than that of the first tubular portion 41. Formed in the first housing portion 42 is a bulging portion 43 with a shape in which a part of a peripheral wall bulges toward a side on which the motor 31 is disposed. On an end wall of the bulging portion 43, an insertion hole 44 extending through the rack shaft 4 in the axial direction is formed.

The second housing member 24 has a second tubular portion 45 and a second housing portion 46 that is formed on the axial second end side of the second tubular portion 45. The second housing portion 46 is formed in a cylindrical shape in which a diameter thereof is larger than that of the second tubular portion 45. A cover portion 47 that covers the bulging portion 43 of the first housing member 23 is formed in the second housing portion 46.

A rotation shaft 51 of the motor 31 is inserted into the bulging portion 43 via the insertion hole 44. The motor 31 is attached to the first housing member 23 via a bolt 52 with the rotation shaft 51 being parallel to the rack shaft 4.

The belt mechanism 32 includes a belt 61, a driving pulley 62, and a driven pulley 63. The belt 61 is made of an elastic material such as rubber, and is wound around the driving pulley 62 and the driven pulley 63 so as to generate a predetermined tension therebetween. The driving pulley 62 is formed in a cylindrical shape around which the belt 61 is wound, and is coupled to the rotation shaft 51 of the motor 31 so as to be coaxially and integrally rotatable.

Figure 3:
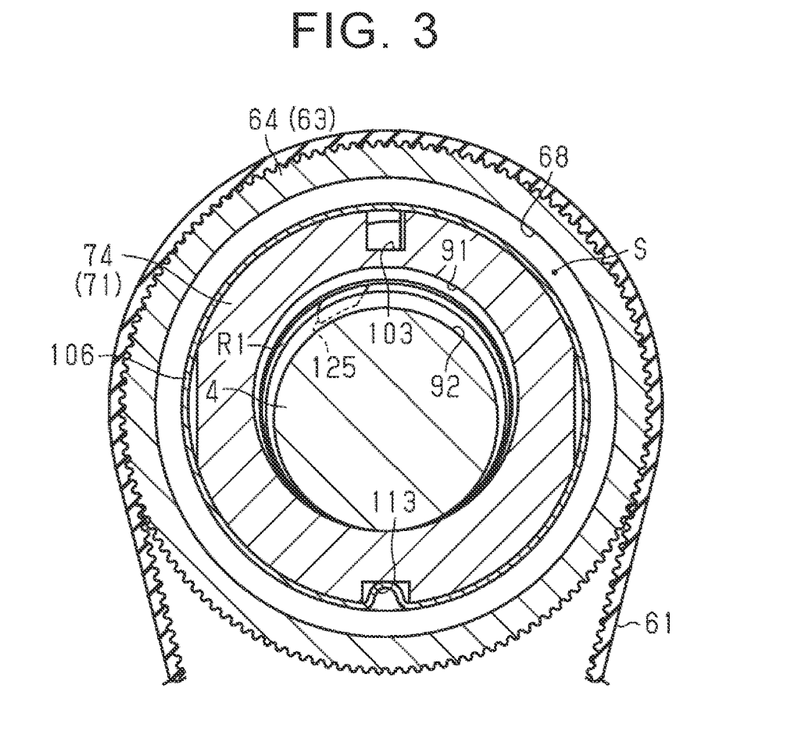
FIG. 3 is a sectional view of a part of the EPS actuator passing through a driven pulley taken orthogonal to the axial direction, and is a sectional view taken along line in FIG. 2.

As illustrated in FIG. 2 and FIG. 3, the driven pulley 63 is formed in a cylindrical shape and has a winding portion 64 around which the belt 61 is wound, an extending portion 65 extending from the winding portion 64 to the axial second end side, and a flange portion 66 extending radially inward from the axial second end side of the extending portion 65. A plurality of insertion holes 67 extending through in the axial direction are formed in the flange portion 66. On the driven pulley 63, a thin portion 68 in which the thickness is reduced so that an inner peripheral surface is recessed is formed. The thin portion 68 of the present embodiment is formed over the entire axial range in which the winding portion 64 is formed, and over the axial range of the extending portion 65 near the winding portion 64. The thin portion 68 is formed in an annular shape extending over the entire circumferential direction of the driven pulley 63. The driven pulley 63 is fitted on the outer periphery of the ball screw nut 71 so as to be integrally rotatable with the ball screw nut 71 described below. The axial position of the winding portion 64 is the same axial position as the driving pulley 62.

The ball screw mechanism 33 includes the rack shaft 4 serving as a screw shaft, the ball screw nut 71 coaxially disposed on an outer periphery of the rack shaft 4, and a plurality of balls 72 provided between the rack shaft 4 and the ball screw nut 71.

As illustrated in FIG. 2, and FIG. 4 to FIG. 6, the ball screw nut 71 is formed in a stepped cylindrical shape with a different outer diameters, and has a large diameter tubular portion 73 and a small diameter tubular portion 74 that is provided on the axial second end side of the large diameter tubular portion 73. The outer diameter of the large diameter tubular portion 73 is set to be larger than the outer diameter of the small diameter tubular portion 74. An annular supporting portion 75 extending radially outward is formed between the large diameter tubular portion 73 and the small diameter tubular portion 74.

As illustrated FIG. 2, on the outer periphery of the large diameter tubular portion 73, a rolling bearing 81 is fitted adjacent to the axial first end side of the supporting portion 75, and a retainer 82 is fitted adjacent the axial first end side of the rolling bearing 81. An annular fixing groove 83 extending over the entire circumference is formed at a position near the axial first end on the outer periphery of the large diameter tubular portion 73. The retainer 82 is clinched so that a part thereof is in close contact with the fixing groove 83 and thus, the retainer 82 is fixed so that the rolling bearing 81 is pressed against the supporting portion 75. In this way, the ball screw nut 71 is rotatably supported in the first housing portion 42 and the second housing portion 46.

A double-row angular contact ball bearing is adopted as the rolling bearing 81, and a preload is applied by a retainer 82 so that an internal clearance becomes a preset clearance. On both sides of the rolling bearing 81, a cage 85 having an L-shaped cross section is disposed adjacent to an outer ring of the rolling bearing 81. On the cage 85, an elastic body 86 such as rubber is each disposed between the first housing member 23 and the second housing member 24, while each elastic body 86 is compressed.

The outer diameter of the small diameter tubular portion 74 is set to be generally the same as the inner diameter of an un-thinned portion of the extending portion 65 of the driven pulley 63. The extending portion 65 is fitted on the outer periphery of the small diameter tubular portion 74. In this way, as illustrated in FIG. 2 and FIG. 3, a radial clearance S that extends along the entire circumference is defined between the thin portion 68 of the driven pulley 63 and the small diameter tubular portion 74 of the ball screw nut 71. In the small diameter tubular portion 74, a sectional shape orthogonal to the axial direction is a shape in which parts of a circle are cut to be parallel to each other. A plurality of bolt holes 87 are formed in an end face of the small diameter tubular portion 74 on the axial second end side. A bolt 88 is screwed into a bolt hole 87 via the insertion hole 67 so that the ball screw nut 71 is coupled to the driven pulley 63 to be rotatable together with the driven pulley 63. In this way, the driven pulley 63 is rotatably disposed on the outer periphery of the rack shaft 4.

As illustrated FIG. 2, a screw groove 91 is formed in an inner periphery of the ball screw nut 71. In contrast, a screw groove 92 corresponding to the screw groove 91 is formed on the outer periphery of the rack shaft 4. A spiral ball raceway R1 is formed by the screw grooves 91 and 92 facing each other. In the ball raceway R1, the balls 72 are disposed so as to be sandwiched between the screw grooves 91, 92. That is, the ball screw nut 71 is screwed to the outer periphery of the rack shaft 4 via each ball 72. In this way, each ball 72 rolls in the ball raceway R1 while receiving a load in response to a relative rotation between the rack shaft 4 and the ball screw nut 71. Then, relative positions of the rack shaft 4 and the ball screw nut 71 in the axial direction are displaced by the rolling of each ball 72 so that a torque of the motor 31 is applied to the rack shaft 4 as an assist force.

In the ball screw nut 71, a circulation path R2 that opens at two connection points P1, P2 set in the screw groove 91 is formed. With the circulation path R2, the ball raceway R1 is short-circuited between the two connection points P1, P2 corresponding to opening positions. Thus, each ball 72 that rolls in the ball raceway R1 and reaches the connection point P1 or the connection point P2 passes through the circulation path R2 to be discharged at the connection point P1 or the connection point P2 and moves along the ball raceway R1 from the downstream side to the upstream side. Thus, each ball 72 circulates infinitely. In the circulation path R2, as a new ball 72 enters the circulation path R2 from the ball raceway R1, each ball 72 is pushed by the ball 72 adjacently behind in the circulation direction to move in the circulation path R2.

Next, the configuration of the circulation path R2 will be described. As illustrated in FIG. 2, and FIG. 4 to FIG. 6, formed on the ball screw nut 71 is a pair of through holes 101, 102 that extends through the inner and outer periphery, and a first passage 103 that provides communication between the through holes 101, 102 and that opens radially outward. Each of the through holes 101, 102 is provided with a circulation member 105 having a second passage 104 through which the ball 72 can move between the ball raceway R1 and the first passage 103. A pipe 106 serving as a pressing lid for pressing down each circulation member 105 from the outer periphery and for covering the first passage 103 is fixed on the outer periphery of the ball screw nut 71. The first passage 103 and the second passage 104 of each circulation member 105 configure a circulation path R2.

Figure 4:
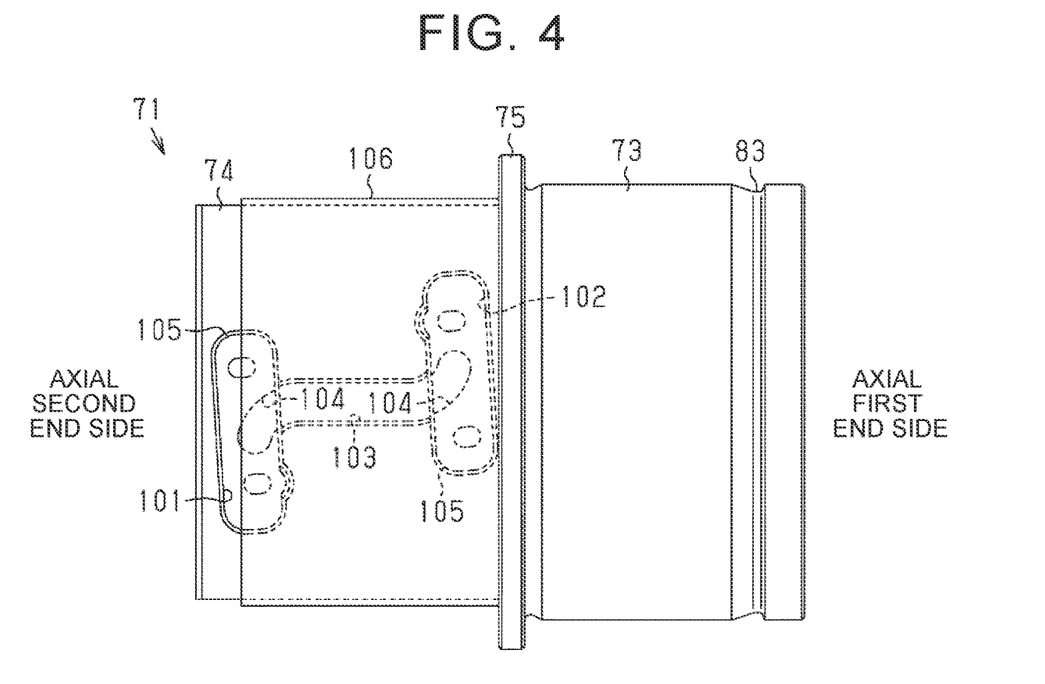
FIG. 4 is a plan view of a ball screw nut in which a circulation member and a pipe are fixed according to the first embodiment, when viewed from a radially outer side.
Figure 5:
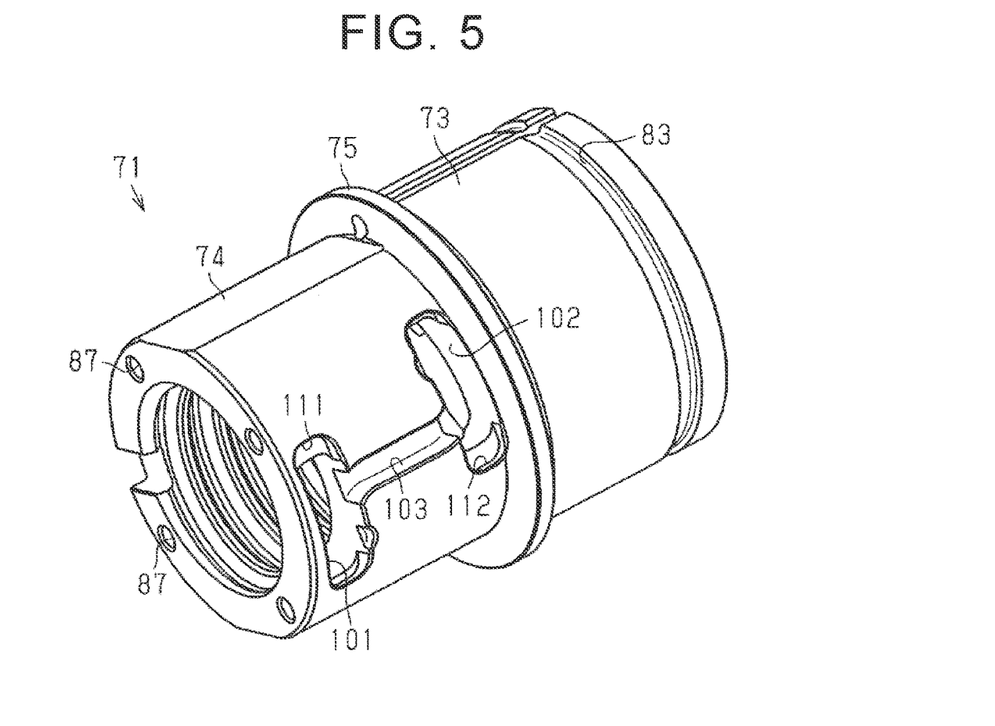
FIG. 5 is a perspective view of the single ball screw nut according to the first embodiment.
Figure 6:
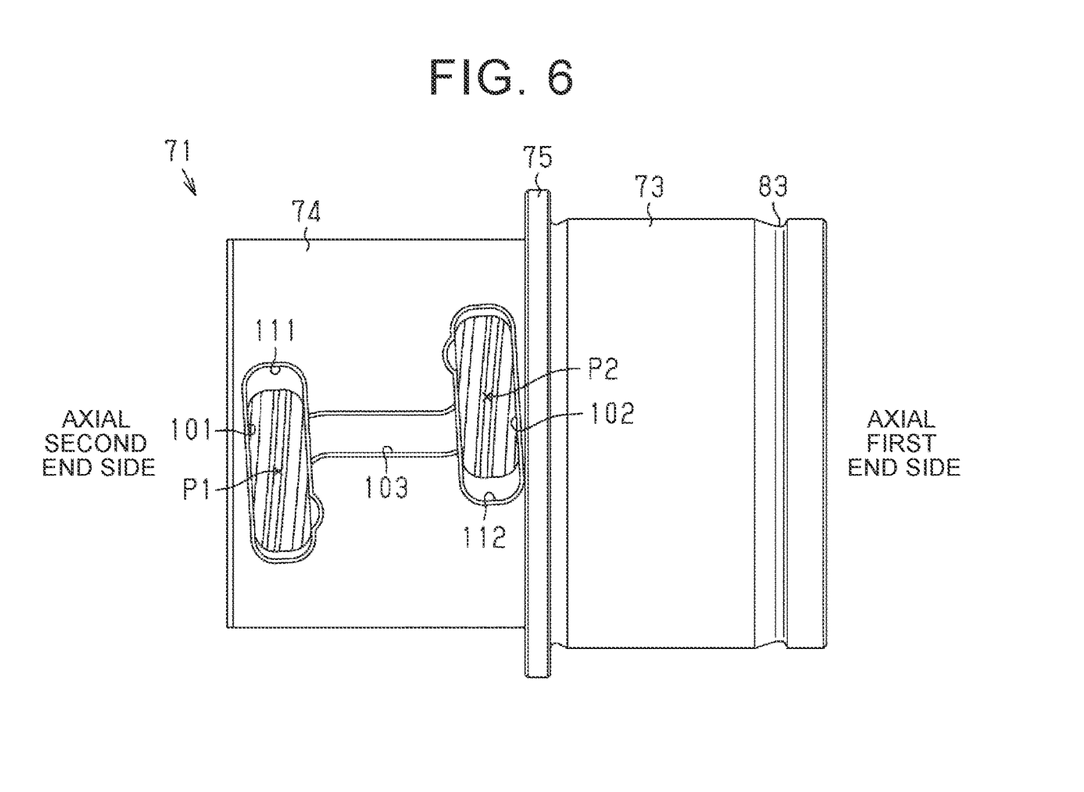
FIG. 6 is a plan view of the single ball screw nut according to the first embodiment when viewed from the radially outer side.
Figure 7:
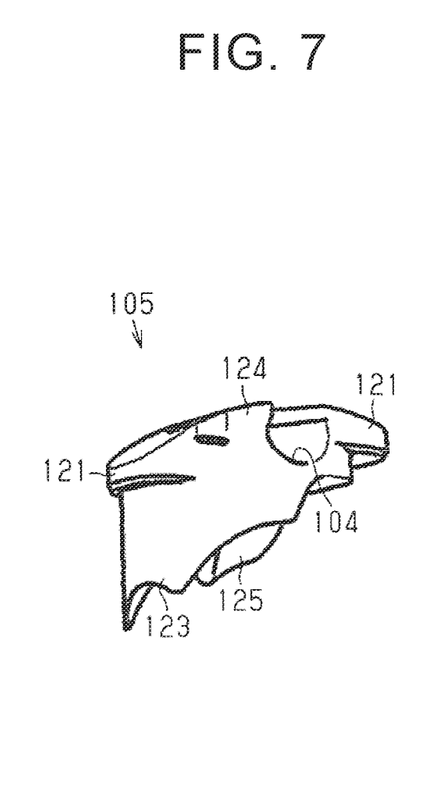
FIG. 7 is a perspective view of the circulation member according to the first embodiment.
Figure 8:
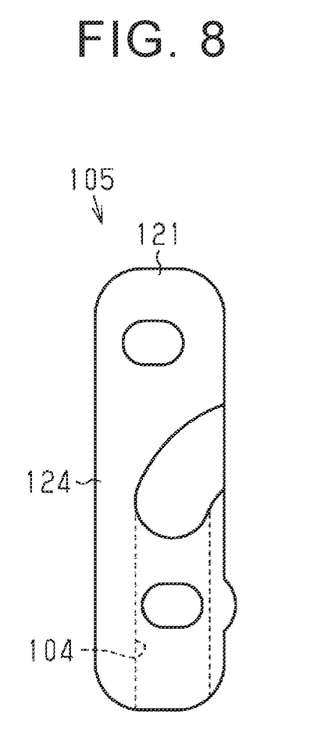
FIG. 8 is a plan view of the circulation member according to the first embodiment when viewed from the radially outer side of the ball screw nut.
Figure 9:
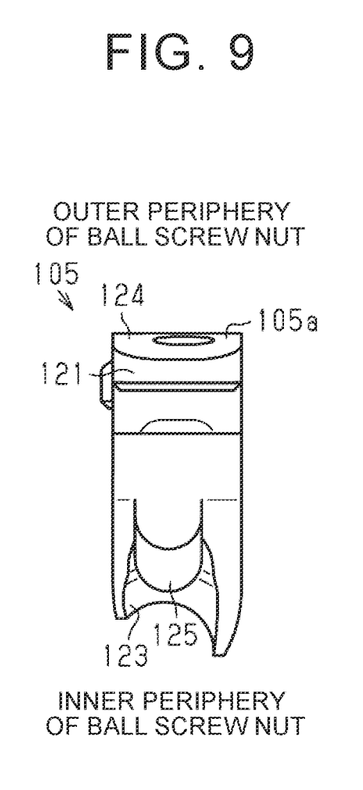
FIG. 9 is a side view of the circulation member according to the first embodiment when viewed from one side in the circumferential direction of the ball screw nut.
Figure 10:
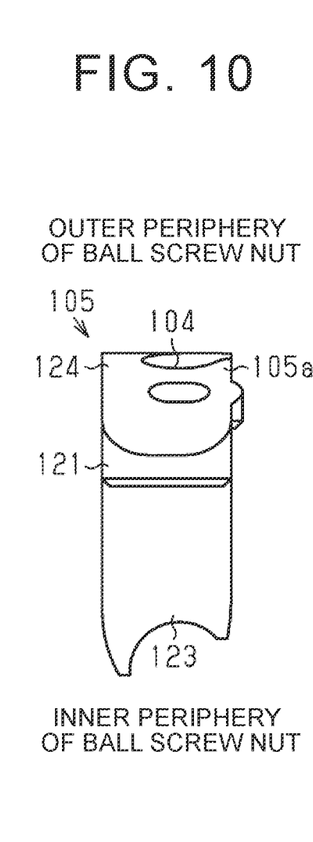
FIG. 10 is a side view of the circulation member according to the first embodiment when viewed from the other side in the circumferential direction of the ball screw nut.
Figure 11:
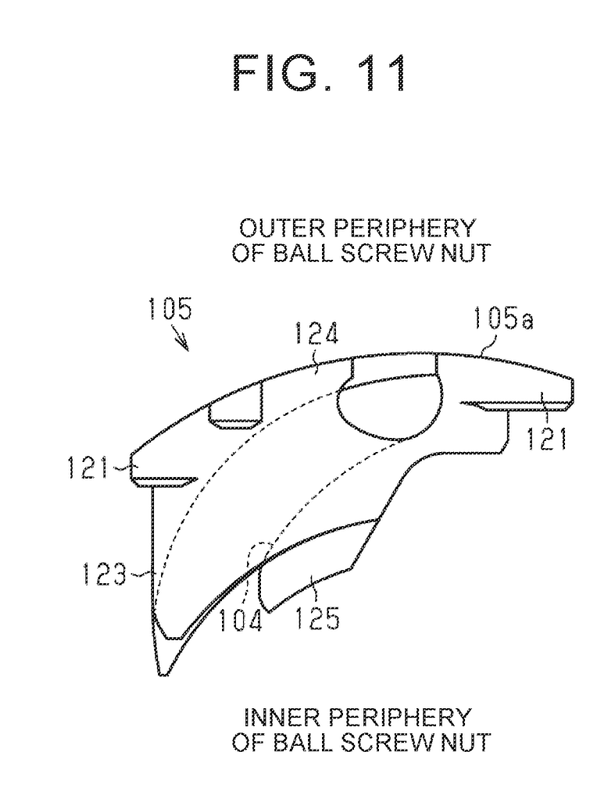
FIG. 11 is a side view of the circulation member according to the first embodiment when viewed from the axial direction of the ball screw nut.
Figure 12:
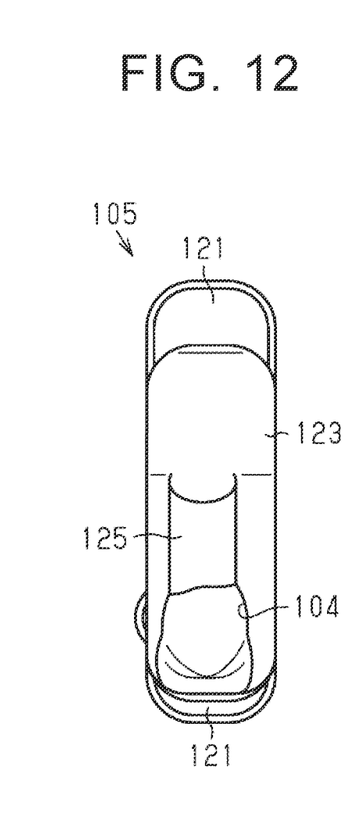
FIG. 12 is a bottom view of the circulation member according to the first embodiment when viewed from a radially inner side of the ball screw nut.

In detail, as illustrated in FIG. 4 to FIG. 6, the through holes 101, 102 are formed in the small diameter tubular portion 74 of the ball screw nut 71. The through hole 101 is formed at a position corresponding to the connection point P1, and the through hole 102 is formed at a position corresponding to the connection point P2.

Each of the through holes 101, 102 is formed in an oval shape that extends through the inside and the outside of the ball screw nut 71. Shallow grooves 111, 112 that extend from the outer peripheral part of the ball screw nut 71 in the through holes 101, 102 to the respective sides in the circumferential direction of the ball screw nut 71 are formed in the small diameter tubular portion 74. The connection points P1, P2 are set at positions between which a screw groove 91 for several turns is interposed in the axial direction of the ball screw nut 71. The through holes 101, 102 are formed at positions spaced away from each other in the axial direction of the ball screw nut 71. The connection points P1, P2 are set at positions shifted from each other in the circumferential direction of the ball screw nut 71, and the pair of through holes 101 and 102 are formed at positions shifted from each other in the circumferential direction of the ball screw nut 71. The through hole 101 and the through hole 102 are formed so as to be point-symmetric with respect to the center of the first passage 103 when viewed in the radial direction of the ball screw nut 71.

The first passage 103 extends along the axial direction of the ball screw nut 71, and is connected to a position in the through hole 101 closer to one end portion of the through hole 101 in the circumferential direction of the ball screw nut 71 than the circumferential center of the through hole 101, and a position in the through hole 102 closer to the other end portion of the through hole 102 in the circumferential direction of the ball screw nut 71 than the circumferential center of the through hole 102. Both ends of the first passage 103 are slightly curved with respect to the axial direction of the ball screw nut 71 so as to be connected smoothly to the second passage 104. The cross section of the first passage 103 orthogonal to the axial direction of the ball screw nut 71 has a rectangular shape having a width and a depth that are slightly larger than the diameter of the ball 72.

As illustrated in FIG. 2 and FIG. 3, a recessed portion 113 is formed on the outer peripheral surface of the ball screw nut 71. The recessed portion 113 is formed in a round hole shape. The recessed portion 113 is formed at a position that is shifted by about 180° around the axis of the ball screw nut 71 with respect to the through holes 101, 102.

As illustrated in FIG. 4 and FIG. 7 to FIG. 12, each circulation member 105, a function of scooping up the ball 72 from the ball raceway from R1 and the function of discharging the ball 72 to the ball raceway R1. Each circulation member 105 is formed in a columnar shape that follows the sectional shape of the through holes 101, 102 when viewed from the radially outer side. Each circulation member 105 is provided with extended rib portions 121 in an outer peripheral direction of the ball screw nut 71, the extended rib portions 121 extending toward respective sides in the circumferential direction of the ball screw nut 71. An end face 105a of each circulation member 105 positioned on the outer peripheral side of the ball screw nut 71 is curved so as to follow the outer peripheral surface of the small diameter tubular portion 74 when viewed in the axial direction of the ball screw nut 71. That is, when viewed in the axial direction of the ball screw nut 71, the curvature of the end face 105a is set to be generally equal to the curvature of the outer peripheral surface of the small diameter tubular portion 74. The circulation member 105 is inserted in each of the through holes 101, 102 such that the rib portion 121 is fitted in the shallow grooves 111, 112. With the circulation member 105 inserted in the through holes 101, 102, the end face 105a is flush with the outer peripheral surface of the small diameter tubular portion 74.

The second passage 104 opens to an insertion end portion 123 positioned in the circulation member 105 on the inner peripheral side of the ball screw nut 71. The second passage 104 is formed so as to extend while curving smoothly from the insertion end portion 123 toward a base end portion 124 positioned on the outer peripheral side of the ball screw nut 71, and opens to the base end portion 124 to be connected to the first passage 103. The inner diameter of the second passage 104 is set to be slightly larger than the diameter of the ball 72. As illustrated in FIG. 3, FIG. 9, FIG. 11, and FIG. 12, a tongue portion 125 is formed on the insertion end portion 123 so as to enter the screw groove 92 of the rack shaft 4. Here, the tongue portion 125 is for scooping up each ball 72, which has rolled in the ball raceway R1, to the second passage 104.

As illustrated in FIG. 2 to FIG. 4, the pipe 106 is made of metal material and is formed in a cylindrical shape with a small thickness. The length of the pipe 106 along the axial direction is set to be slightly shorter than the length along the axial direction of a part of the driven pulley 63 in which the thin portion 68 is formed. A portion of the pipe 106 facing the recessed portion 113 is clinched so as to enter the recessed portion 113. In this way, the inner peripheral surface of the pipe 106 is in close contact with the outer peripheral surface of the small diameter tubular portion 74. The pipe 106 presses down each circulation member 105 inserted in the through holes 101, 102, and covers the entire first passage 103 and the opening part of the second passage 104 from the outer peripheral side. Thus, the pipe 106 restricts the circulation member 105 from falling off and the ball 72 passing through the first passage 103 and the second passage 104 from jumping out. The circulation member 105 inserted in the through hole 101 is also pressed down by the extending portion 65 of the driven pulley 63.

The inner diameter of the pipe 106 of the present embodiment is set to be slightly larger than the outer diameter of the small diameter tubular portion 74, before the part facing the recessed portion 113 is clinched. The pipe 106 is configured to be loosely fitted to the tubular portion 74. Then, a part of the pipe 106 facing the recessed portion 113 is clinched toward the recessed portion 113, the pipe 106 is reduced in diameter and becomes in close contact with the outer peripheral surface of the small diameter tubular portion 74 as described above.

The operations and effects of the present embodiment will be described below. (1) Since the circulation path R2 is configured of the first passage 103 formed in the ball screw nut 71 and the second passage 104 of a pair of the circulation members 105, the shape of each circulation member 105 can be simplified, compared to when a passage that configures the entire circulation path R2 is formed in the circulation member 105, for example. Further, since the driven pulley 63 is provided with the thin portion 68 that defines a radial clearance S between the driven pulley 63 and the ball screw nut 71, it is possible to suppress the weight of the driven pulley 63 from being increased, when the outer diameter of the driven pulley 63 is increased to increase the speed reduction ratio of the belt mechanism 32, for example.

(2) Since the thin portion 68 is formed such that the clearance S extends over the entire circumference of the ball screw nut 71, the thickness of the driven pulley 63 can be reduced over the entire circumference thereof. In this way, when the outer diameter of the driven pulley 63 is increased, it is possible to effectively suppress an increase in the weight of the driven pulley 63.

(3) The circulation member 105 is pressed down by the cylindrical pipe 106 and the first passage 103 is covered by the cylindrical pipe 106. Thus, even when the pipe 106 serving as the pressing lid is fixed to the outer periphery of the ball screw nut 71, it is possible to suppress the weight balance of the ball screw nut 71 in the circumferential direction from varying and maintain smooth rotation of the ball screw nut 71.

(4) For example, when the pipe 106 serving as a pressing lid is press-fitted in the outer periphery of the ball screw nut 71 so that the pipe 106 is brought into close contact with the outer periphery of the ball screw nut 71 to press down the circulation members 105, there is a possibility of the pipe 106 buckling during press-fitting if the thickness of the pipe 106 is thin. Thus, in such a case, it is necessary to increase the thickness of the pipe 106, and the weight of the pipe 106 is increased. In this regard, in the present embodiment, the recessed portion 113 is formed on the outer peripheral surface of the ball screw nut 71 and the pipe 106 is clinched toward the recessed portion 113 at a position facing the recessed portion 113 so that the pipe 106 is in close contact with the outer periphery of the ball screw nut 71 to press down each circulation member 105. Thus, the pipe 106 can be loosely fitted on the outer periphery of the ball screw nut 71, the thickness of the pipe 106 can be thinned, and the weight of the pipe 106 can be suppressed from increasing. The weight of the turning unit 6 can be suppressed from increasing, compared to the case in which the pipe 106 serving as the pressing lid is fixed to the ball screw nut 71 with a bolt, for example.

Second Embodiment

Next, a second embodiment of a steering device having a turning unit will be described with reference to the drawings. For convenience of description, the same components are denoted by the same reference signs as in the first embodiment, and description thereof is omitted.

Figure 13:
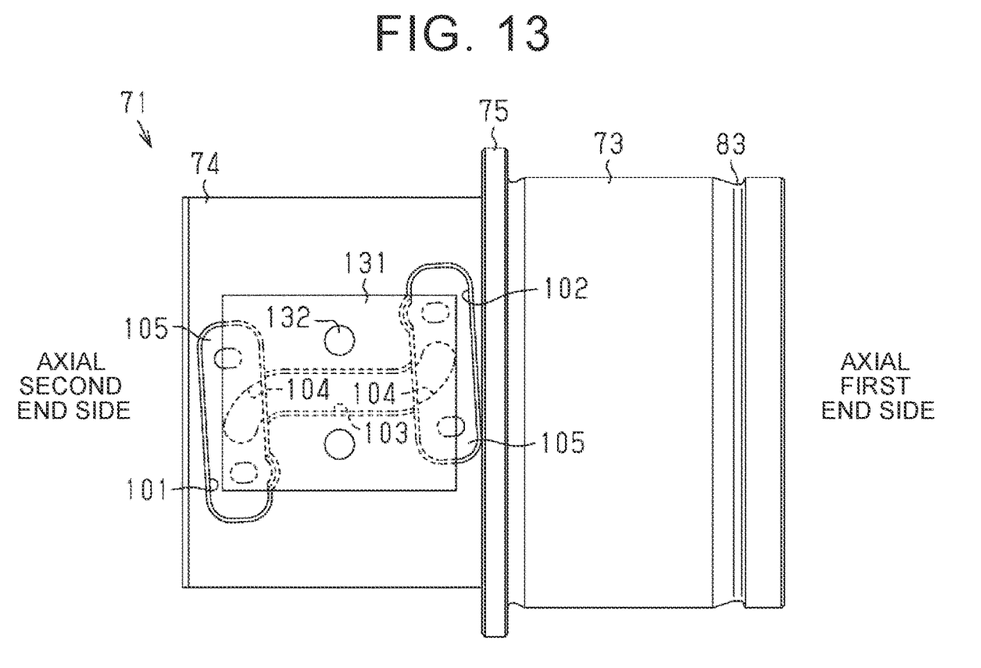
FIG. 13 is a plan view of a ball screw nut in which a circulation member and a curved plate are fixed according to a second embodiment, when viewed from a radially outer side.

As illustrated in FIG. 13, the pipe 106 is not provided on the ball screw nut 71 of the present embodiment and a curved plate 131 that presses down the circulation member 105 and that covers the first passage 103 is fixed to the ball screw nut 71.

The curved plate 131 is formed in a quadrangular shape that covers the entire first passage 103 and that covers the opening part of the second passage 104 in the circulation member 105 when viewed in the radial direction of the ball screw nut 71.

The curved plate 131 is curved so as to follow the outer peripheral surface of the small diameter tubular portion 74 in the axial direction of the ball screw nut 71. That is, when viewed in the axial direction of the ball screw nut 71, the curvature of the curved plate 131 is set to be generally equal to the curvature of the small diameter tubular portion 74.

The curved plate 131 is fixed to the ball screw nut 71 by a bolt 132. The curved plate 131 presses down each circulation member 105 inserted in the through holes 101, 102 and covers the entire first passage 103 and the opening part of the second passage 104 from the outer peripheral side. Accordingly, the curved plate 131 restricts the ball 72 passing through the first passage 103 and the second passage 104 from jumping out.

As described above, in the present embodiment, the following operations and effects are exerted in addition to the operations and effects similar to the operations and effects (1), (2) of the first embodiment. (5) The circulation member 105 is pressed down and the first passage 103 is covered by the curved plate 131 having a curved plate shape. Thus, it is possible to suppress an increase in the weight of the member functioning as the pressing lid, compared to a case in which the pressing lid is formed of a tubular pipe.

Third Embodiment

Next, a third embodiment of a steering device having a turning unit will be described with reference to the drawings. For convenience of description, the same components are denoted by the same reference signs as in the first embodiment, and description thereof is omitted.

Figure 14:
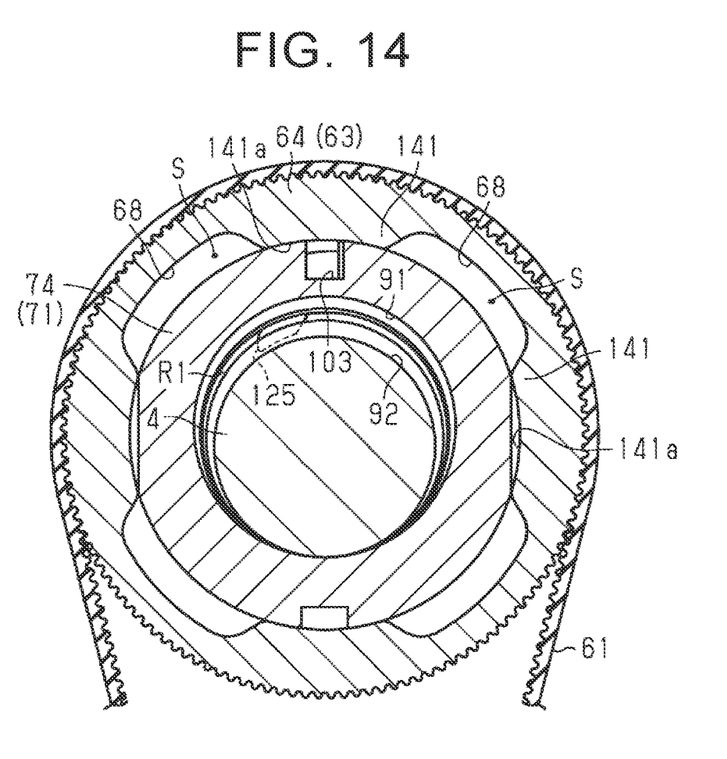
FIG. 14 is a sectional view of a part of an EPS actuator passing through a driven pulley taken orthogonal to the axial direction according to a third embodiment.

As illustrated in FIG. 14, the pipe 106 is not provided in the ball screw nut 71 of the present embodiment. On the driven pulley 63 of the present embodiment, the thin portions 68 that define the radial clearance S between the driven pulley 63 and the outer peripheral surface of the ball screw nut 71 is formed, and a protruding portion 141 that protrudes radially inward of the thin portion 68 is formed. On the driven pulley 63, four thin portions 68 and four protruding portions 141 are formed alternately in the circumferential direction at regular angular intervals. Each thin portion 68 is formed over the entire axial range in which the winding portion 64 is formed and an axial range of the extending portion 65 close to the winding portion 64, similar to the thin portion 68 according to the first embodiment described above. Each protruding portion 141 is formed over the same axial range as the axial range in which the thin portion 68 is formed.

A facing surface 141a of each protruding portion 141 that faces the small diameter tubular portion 74 is curved in the axial direction of the ball screw nut 71 so as to follow the outer peripheral surface of the small diameter tubular portion 74. That is, when viewed in the axial direction of the ball screw nut 71, the curvature of the facing surface 141a is set to be generally equal to the curvature of the outer peripheral surface of the small diameter tubular portion 74. The facing surface 141a is formed in a quadrangular shape that covers the entire first passage 103 and that covers an opening part of the second passage 104 in the circulation member 105 when viewed in the radial direction of the ball screw nut 71.

Since the driven pulley 63 is fitted to the outer periphery of the ball screw nut 71, the protruding portion 141 presses down the circulation members 105 inserted into the through holes 101, 102 and covers the entire first passage 103 and the opening part of the second passage 104 from the outer peripheral side. In this way, the ball 72 passing through the first passage 103 and the second passage 104 is suppressed from jumping out.

As described above, in the present embodiment, the following operations and effects are exerted in addition to the same operations and effects of (1) of the first embodiment. In addition to the thin portion 68, the protruding portion 141 abutting against the outer periphery of the ball screw nut 71 is provided on the inner periphery of the driven pulley 63, and the protruding portion 141 presses down the circulation member 105 and covers the first passage 103. Since a part of the driven pulley 63 functions as a pressing lid in this way, it is possible to suppress an increase in the weight of the driven pulley while suppressing an increase in the number of parts.

On the inner periphery of the driven pulley 63, a plurality of the thin portions 68 and a plurality of the protruding portions 141 are formed alternately in the circumferential direction at regular angular intervals. Thus, variation in the circumferential weight balance of the driven pulley 63 can be suppressed and smooth rotation of the driven pulley 63 can be maintained.

Each of the above embodiments can be modified and implemented as follows. Each of the above embodiments and the following modifications can be implemented in combination with each other to the extent that there is no technical contradiction. In the first embodiment described above, the recessed portion 113 is formed in a round hole shape. However, the present disclosure is not limited to this, and the recessed portion 113 may be formed in a quadrangular hole shape and the shape may be changed as appropriate.

In the first embodiment, a clearance is defined between the pipe 106 and the cutout part of the small diameter tubular portion 74. However, the pipe 106 may be formed so as to be in close contact with the outer peripheral surface of the small diameter tubular portion 74 including the cutout part.

In the first embodiment described above, a part of the pipe 106 is clinched at and the pipe 106 is fixed to the outer periphery of the small diameter tubular portion 74. However, the pipe 106 is not limited to this, and the pipe 106 may be fixed to the outer periphery of the small diameter tubular portion 74 by press-fitting the pipe 106.

In the first embodiment described above, the thin portion 68 need not be formed in an annular shape, and a protruding portion that protrudes radially inward of the thin portion 68 and that abuts against the outer peripheral surface of the pipe 106 may be formed on the inner periphery of the driven pulley 63. Similarly, in the second embodiment described above, a protruding portion that abuts against the outer peripheral surface of the small diameter tubular portion 74 or the curved plate 131 may be formed on the inner periphery of the driven pulley 63.

In the second embodiment described above, the curved plate 131 is fixed by the bolt 132. However, the fixing method of the curved plate 131 can be changed as appropriate. For example, a pin may be formed on the curved plate 131, a hole may be formed on the outer peripheral surface of the small diameter tubular portion 74, and the pin may be press-fitted in the hole so as to fix the curved plate 131. When viewed in the axial direction of the ball screw nut 71, the curved plate 131 may be formed in a C-shape, the curvature of the curved plate 131 may be set to be larger than the curvature of the small diameter tubular portion 74, and the curved plate 131 may be fixed to the outer periphery of the small diameter tubular portion 74 with the elastic force of the curved plate 131.

In the third embodiment described above, the plurality of thin portions 68 and the plurality of protruding portions 141 need not be formed alternately in the circumferential direction at regular angular intervals. Only one thin portion 68 and one protruding portion 141 may be provided.

In each of the above embodiments, the circulation member 105 may be configured so as not to be pressed down by the extending portion 65 of the driven pulley 63. In each of the above embodiments, the driven pulley 63 is fixed to the ball screw nut 71 with the bolt 88 so that the driven pulley 63 is integrally rotatable with the ball screw nut 71. However, the disclosure is not limited to this, and the fixing method may be changed as appropriate.

In each of the above embodiments, the axial range in which the thin portion 68 is formed can be changed as appropriate. In the above embodiments, the steering device 1 is configured as an electric power steering system. However, the present disclosure is not limited to this, and the steering device 1 may be configured as a steer-by-wire type steering device in which power transmission is separated between a steering unit that is steered by a driver and a turning unit that turns the steered wheels 5 according to the steering operation of the driver.

Next, a technical idea that can be developed from each of the above embodiments and the modification will be described below. A steering device having a turning unit of any configuration described above, a steering shaft to which a steering wheel is connected, and a conversion mechanism that converts a rotation of the steering shaft into a reciprocating motion of the turning shaft.

What is claimed is:

1. A turning unit comprising:
a turning shaft housed in a housing so that the turning shaft is reciprocable;
a belt mechanism having a driving pulley coupled to a motor, a driven pulley on an outer periphery of the turning shaft so that the driven pulley is rotatable, and a belt that is wound around between the driving pulley and the driven pulley; and
a ball screw mechanism that has a ball screw nut coupled to the driven pulley so that the ball screw nut is integrally rotatable, and a plurality of balls in a ball raceway that has a helical shape and is configured such that a screw groove on the outer periphery of the turning shaft faces a screw groove on an inner periphery of the ball screw nut, and that converts a rotation of the ball screw nut into reciprocating movement of the turning shaft, wherein the ball screw nut has a pair of through holes extending through the inner periphery and an outer periphery of the ball screw nut, and a first passage that allows the through holes to communicate with each other and that opens radially outward, the ball screw mechanism has a circulation member having a second passage through which the ball can move between the ball raceway and the first passage in each of the through holes, the ball screw mechanism has a circulation path for communicating two connection points set on the ball raceway by the first passage and the second passages, an inner periphery of the driven pulley has a thick portion and a thin portion, a radial clearance bounded by the driven pulley at the thin portion and the outer periphery of the ball screw nut, and the ball screw mechanism has a pressing lid that presses down each of the circulation members from the outer periphery of the ball screw nut and that covers the first passage.

2. The turning unit according to claim 1, wherein the radial clearance extends over an entire circumference of the ball screw nut.

3. The turning unit according to claim 2, wherein the pressing lid is a pipe that has a tubular shape and that is fitted to the outer periphery of the ball screw nut.

4. The turning unit according to claim 3, wherein:
the ball screw nut has a recessed portion on an outer peripheral surface; and
the pipe is clinched at a position facing the recessed portion toward the recessed portion and is fixed to the ball screw nut.

5. The turning unit according to claim 1, wherein the pressing lid is a curved plate that has a plate shape and that is curved so as to follow the outer periphery of the ball screw nut.

6. The turning unit according to claim 1, wherein:
the driven pulley has on an inner periphery, a protruding portion protruding radially inward of the thin portion; and
the pressing lid is the protruding portion.

7. The turning unit according to claim 1, wherein the outer periphery of the ball screw nut is a radially outermost portion of the ball screw nut where the ball screw nut and the driven pulley axially overlap.

* * * * *